W. H. HARN.
Sealing Cans.
No. 28,366.
Patented May 22, 1860.
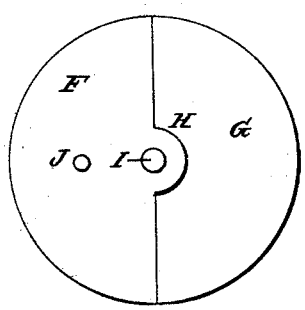
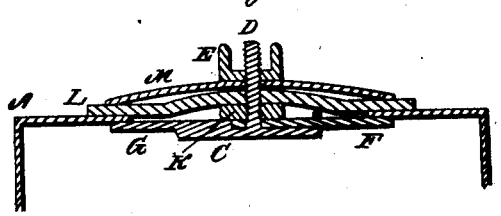
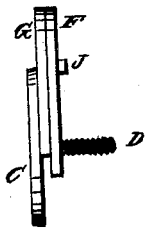
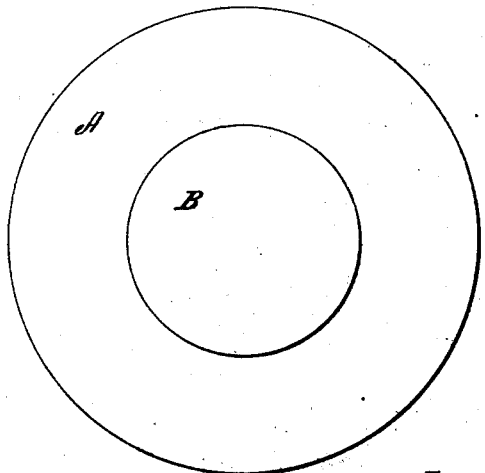
Witnesses:
Inventor:
William H. Harn.

UNITED STATES PATENT OFFICE.

WILLIAM H. HARN, OF CARLISLE, PENNSYLVANIA.

IMPROVEMENT IN PRESERVE-CANS.

Specification forming part of Letters Patent No. 28,366, dated May 22, 1860.

*To all whom it may concern:*

Be it known that I, WILLIAM H. HARN, of Carlisle, in the county of Cumberland and State of Pennsylvania, have invented a new and useful Improvement in Disks for Closing the Openings in Preserve Jars or Cans and other Vessels; and I do hereby declare that the same is described and represented in the following specification and drawings.

To enable others skilled in the art to make and use my improvement, I will proceed to describe its construction and use, referring to the drawings, in which the same letters indicate like parts in each of the figures.

Figure 1 is the top of a can with an opening in it. Fig. 2 is a plan of the divided disk. Fig. 3 is an elevation of the divided disk, with the movable part swung around over the other. Fig. 4 is a section showing the top of the can closed.

The nature of my invention and improvements in disks for closing the openings in preserve cans or jars and other vessels consists in making the disk which is to be inserted through the opening in the can in two parts, and arranging one of the parts to swing around over the other, so that both of them can be passed through the opening in the can, and then the part which was swung over the other is swung off of it, so as to cover the inside of the opening in the can as it is drawn against it to close it, which improvements adapt my disks to the cans that have heretofore been soldered up when used, and is available for those who have not the means or skill to solder up the openings in their cans, and it is also available for glass and earthen jars and for other purposes.

In the accompanying drawings, A is the end of a can, and B the opening in it, through which opening it may be filled or emptied. C is a small disk of metal, with the screw D fastened in its center, which is provided with a nut, E, for the purpose of holding the disk in the position required when the can is closed.

The disk shown in Fig. 2 is made in two parts, F and G, being divided on the line H. The part G is fastened to the disk C by soldering or otherwise, as shown in Fig. 3; or the disk C and part G may be cast in one piece and rendered malleable by a process that is common and well known; and the part F may be made of wrought-iron or of cast-iron rendered malleable, as above mentioned. It is made in the form shown in Fig. 2, and provided with a hole, I, for the screw D, which holds it in its place, and also with a short pin, J, by which it may be lifted or held in the can, while the part G is pressed down and swung around under it, so that both of them can be passed out of the opening B in the can at once and passed in again, when desired, and one of the parts held while the other is swung around into a proper position to close the opening in the can, and when so arranged the nut K, Fig. 4, may be screwed down on top of the part F, so as to hold it firmly in a proper position to close the opening in the can. I then apply a circular piece of india-rubber or some other kind of packing, as shown at L, Fig. 4, and upon that the circular concave plate or disk of metal M, and screw on the thumb-nut E, so as to draw the disk on the inside tight against it and the disk M tight against the packing, so as to make a strong, firm, and air-tight joint and close or seal the opening in the can, and thus furnish a stopper that will be air-tight, and one that can be readily removed and replaced whenever it is desirable to do so, and thereby render useful an immense number of old cans which have been used once, and are of very little, if any, value without my invention to close the opening in them.

The disks, screw, and nuts may all be tinned or galvanized, to prevent their being corroded by the contents of the can, and by applying a packing of thin cloth saturated with beeswax between the disk inside the can and the end of the can the contents of the can will be prevented from coming in contact with india-rubber or other packing used under the disk M.

I believe I have described and represented my improvements in disks for closing the openings in preserve cans or jars or other vessels, so as to enable any person skilled in the art to make and use it. I will now state what I desire to secure by Letters Patent, to wit:

What I claim as my invention and improvement is—

In disks for closing the openings in preserve jars or cans or other vessels, making the inside disk in two parts or pieces, substantially as described, so that it may be readily passed into or through the opening to be closed.

WILLIAM H. HARN.

Witnesses:
J. DENNIS, Jr.,
JOHN S. HOLLINGSHEAD.